United States Patent Office 3,492,136
Patented Jan. 27, 1970

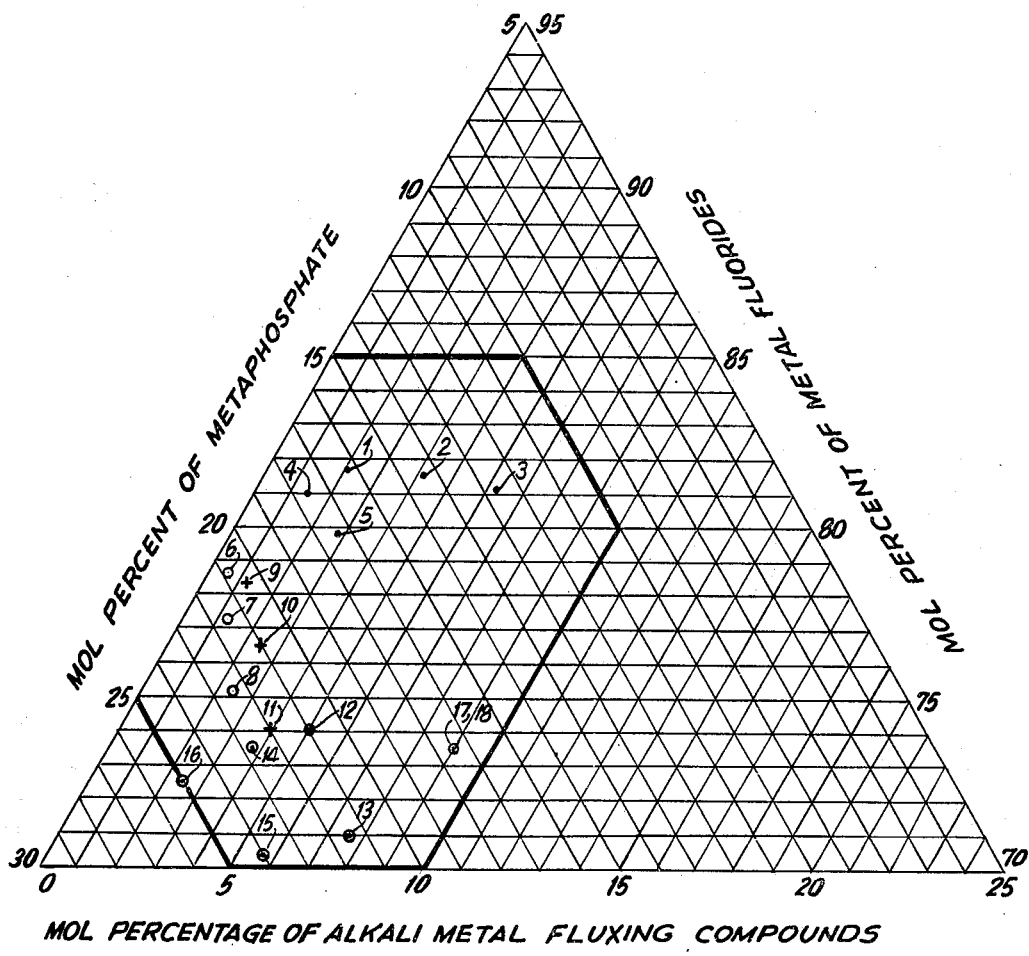

3,492,136
FLUOROPHOSPHATE OPTICAL GLASS AND
METHOD OF PREPARING THE SAME
Heinz Brömer, Hermannstein, Kreis Wetzlar, and Norbert
Meinert, Wetzlar, Germany, assignors to Ernst Leitz
G.m.b.H., Wetzlar (Lahn), Germany
Filed Dec. 22, 1966, Ser. No. 603,978
Claims priority, application Germany, Dec. 31, 1965,
L 52,511
Int. Cl. C03c *3/12, 3/16, 3/18*
U.S. Cl. 106—47    3 Claims

ABSTRACT OF THE DISCLOSURE

Fluorophosphate optical glasses are disclosed which consist essentially of: between 70 and 85 mol percent of the fluorides of the alkaline-earth metals magnesium, calcium, strontium, barium; between 10 and 25 mol percent of the metaphosphates of the alkaline earth metals magnesium, calcium, strontium, barium and of aluminum; and between 0.5 and 10 mol percent of an alkali-metal fluxing compound selected from the group of $KAsO_3$, $K_2TaF_7$ and $K_2TiF_6$, the ratio of fluorine atoms to phosphorous atoms in said glass being between 2.5 and 4.5. These glasses exhibit refractive indices between 1.53 and 1.57 and Abbe numbers between 55.1 and 72.2. A method of making said glasses is also disclosed.

---

This invention relates to optical glasses having a relatively high index of refraction and small dispersion and more particularly to such glasses containing fluorophosphates. The optical glass of this invention is especially useful to provide an optical glass for an optical system in which the secondary spectrum chromatic defect is reduced or corrected.

An optical system can be made free of secondary spectrum, that is, the residual chromatic defect of an achromatic lens chromatized for two colors, by the use of optical glass made of crystals, such as fluorite (fluorspar), $CaF_2$, since such crystals exhibit strong anomalous dispersion. Anomalous dispersion is the discontinuity in the dispersion curve that is the characteristic plot of the refractve index as a function of wavelength. For normal dispersion the refractive index of the glass or crystal decreases with increasing wavelength. Such an optical system free of secondary spectrum is termed apochromatic. Fluorite crystals, however, are very difficult to process in optical glass and are very costly if they are to have the necessary optical purity. Because of these problems, it has become important to find suitable substitute crystals or optical glasses having optical characteristics which are equal or nearly equal to the fluorite crystals. To that end optical glasses have heretofore been made of fluorides including beryllium fluoride ($BeF_2$) functioning as the vitrifying agent. However, due to the beryllium content, such glasses are extremely poisonous and accordingly dangerous to the health of the user. Furthermore, an optical glass made of fluorides must be very quickly quenched.

Optical glasses made of high proportions of fluorides free of beryllium are also known. Metaphosphates of the elements of Groups I, II and III of the Periodic Table function as the vitrifying agent or glass former in such fluoride glasses. As compared to the aforementioned beryllium-fluoride glasses, these beryllium-free glasses have a higher refractive index and can also be smelted in larger pieces. Owing to the high fluorine content which leads to vaporization of the melt, it has been found to be practically impossible to smelt these glasses in such a manner that they are free of optical inhomogeneities such as cords or striae. The reason for this defect is that, as a result of the evaporation of the fluorine compounds which occurs on both the inside and outside surfaces of the stock, it is practically impossible to homogenize the melt. Thus, the homogenization of the melt could be achieved, if the casting or pouring step or phase of the process were at a temperature at which practically no reactions could occur which lead to the transformation of the fluorides into oxy-fluorides or oxides.

We have discovered certain compounds having useful properties of advantage for smelting or fusion of the desired fluorophosphates. We have discovered that glasses containing these compounds, which we shall for convenience term "alkali metal fluxing compounds," can be reduced to extremely low temperatures without crystallizing, at which low temperatures practically no fluorine compounds evaporate. Only by this means is it possible to obtain large pieces of striae-free optical glass. We have found that within preferred proportions by the use of these fluxing compounds the defects were eliminated. The reason for this unexpected result of these compounds is presumably to be found in the following rationalization. The build-up of complex-formation substances with higher complex valences, such as the silicates, phosphates, borates, etc., in the presence of a greater amount of ions for example of, aluminum, Al, titanium, Ti, lanthanum, La, cerium, Ce, etc., leads to the formation of higher molecular complex network or reticular structures in glasses. In general, such glasses can be used for optical purposes but only to a very limited extent, because of the reticular or network aspect of the glass, i.e., the long chain molecules bringing about the undesirable striae mentioned above.

Through the introduction of co-ordinative single valence complex ligands, preferably fluorine ions, however, also other such as hydroxyl or chlorine ions, a reduction of the network can be brought about. This reduction of the silicate or phosphate lattice leads to a decrease of the molecular size, but the type of lattice remains.

First, starting with a certain composition, a transformation in the structure of the network which is typical for glasses becoming apparent, whereby the net structures are transformed more or less into macro-molecules which are preferably thread-shaped (filamentary). This is combined with an immediate, unexpected and spring-like change of the glass properties. On the other hand, this also contributes to the fact that the range of composition within which these special properties of the glasses are retained is relatively very limited. These special properties of the glasses are probably based on the fact that they contain mixtures of network and filamentary molecules in an appropriate composition.

According to our invention, the glasses are to be melted (molten) from mixtures which consist from 70 to 85 mol percent of fluorides of the alkaline-earth metals magnesium, calcium, strontium and barium, from 10 to 25 mol percent of the metaphosphates of the above-named alkaline-earth metals and of aluminum, and up to 10 mol percent of alkali-metal fluxing compounds, the potassium content compounds of which, for example, comprise $KAsO_3$, $K_2TaF_7$ and/or $K_2TiF_6$. Sodium is an equivalent for potassium in these compounds. Lithium, rubidium, caesium and virginium can also be used but for the cost of these compounds. Virginium has the additional objection that it is radioactive.

In order to make adjustments in certain optical values, up to 3 mol percent of lanthanum-orthophosphate may be added to the mixture. Thus, by the use of such small amounts of lanthanum orthophosphate, $LaPO_4$, we have found that the index of refraction, $n_e$, can be increased with the Abbe value, $v_e$, remains constant, and, also, for certain requirements we can provide optical glasses with higher Abbe values keeping the index of refraction constant.

According to the invention the ratio ($F/P$) of fluorine atoms to phosphorous atoms is preferably in the range of 2.5 to 4.5. As the fluorine atom content increases beyond the upper limit, we have found the fluorine compounds evaporate in the melt resulting in the undesired striae particularly in the upper melt-layer portion. As the fluorine content is reduced below the lower limit, we have found that the fluorine content is insufficient to achieve the high optical refractive indices and Abbe values that are needed. Particularly undesirable, for ratios below 2.5, is the small $\Delta v_e$ value (to be described) which contributes to the desired reduction or elimination of the secondary spectrum.

Eighteen examples of glass melts of varying compositions made according to the invention are shown in the following tables and illustrated graphically in the accompanying drawing.

There are five tables, namely 1, 2, 3, 4 and 5, and these tables contain a numbered glass composition (melt number) in percentages by weight and also the same (melt number) compositions in mol percent.

In the tables there is a melt number, then follows columns showing the percent by weight or by mol of the various constituents.

Column "$F/P$" indicates the ratio of fluorine atoms to the phosphorous atoms in each composition, the refractive index is shown under "$n_e$," the Abbe number under "$v_e$" and $\vartheta'g$ indicates the partial dispersion. The numerical value of $\vartheta'g$ it is to be understood is corrected by the factor $10^{-4}$. $\Delta v_e$ indicates the deviation in the Abbe number. See our co-pending United States application, "Optical Crown Glass," Ser. No. 542,035, filed on Apr. 12, 1966, now Patent No. 3,451,829 for a more detailed description of the factor $\Delta v_e$.

In the drawing, for ease in identifying the various melts, the first five melts are indicated by a dot and numbered 1 to 5. 6, 7 and 8 are indicated by circles, 9, 10 and 11 are indicated by crosses, and 12 to 18 by a dot and circle.

The glasses of our invention lie within the area outlined in heavy lines, the mol percent of the phosphate varying between 15 and 25%, the mol percent of the metal fluorides being within 70 and 85%, and the mol percent of $K_2TiF_6$—potassium fluorotitanate, $KAsO_3$—potassium arsenate, $K_2TaF_7$—potassium fluorotantalate, being within 0.5 and 10%. And as shown in melt 6 as low as 0.7 mol percent. The mol percentages of the three groups of constituents are inter-related, the percentage of any two, within the limits of the diagram, determining the percentage of the third, the total of the percentages in each case being 100. In melts 1–4 in which a small addition of $LaPO_4$ is present, the percentages of the three constituents is less than 100% of the total mix but in such cases the mol percentages of the three constituents of the ternary base composition amount to percentages of the ternary composition within the boundary outlined in heavy lines and conform to the characteristics of the glass of our invention. The addition of a small amount of an additive, as in melts 1–4, does not impair the melting and other special characteristics of the glass.

It may be noted that in Tables 1 and 3 a small mol percent, 1–2% of lanthanum orthophosphate, $LaPO_4$, has been added. Such small additions may be made to modify optical properties without substantial rise in melting temperatures.

TABLE 1
[Weight percent]

| Melt No. | Al(PO$_3$)$_3$ | Ca(PO$_3$)$_2$ | LaPO$_4$ | KAsO$_3$ | MgF$_2$ | SrF$_2$ | BaF$_2$ | F/P | $n_e$ | $v_e$ | $\vartheta'g$ (×10$^{-4}$) | $\Delta v_e$ |
|---|---|---|---|---|---|---|---|---|---|---|---|---|
| 1 | 24.5 | 4.8 | 3.4 | 2.4 | 16.4 | 23.8 | 24.7 | 3.48 | 1.5400 | 73.6 | 4837 | +14.2 |
| 2 | 24.5 | 2.4 | 3.4 | 4.8 | 16.4 | 23.8 | 24.7 | 3.76 | 1.5372 | 73.3 | 4812 | +12.2 |
| 3 | 24.5 |  | 3.4 | 7.2 | 16.4 | 23.8 | 24.7 | 4.08 | 1.5313 | 73.9 | 4829 | +13.6 |
| 4 | 24.5 | 7.2 | 1.7 | 1.7 | 16.4 | 23.8 | 24.7 | 3.32 | 1.5413 | 73.0 | 4811 | +11.5 |
| 5 | 24.5 | 7.2 |  | 3.4 | 16.4 | 23.8 | 24.7 | 3.38 | 1.5402 | 72.7 | 4799 | +10.2 |

TABLE 2
[Weight percent]

| Melt No. | Al(PO$_3$)$_3$ | Ca(PO$_3$)$_2$ | MgF$_2$ | CaF$_2$ | SrF$_2$ | BaF$_2$ | K$_2$TiF$_6$ | K$_2$TaF$_7$ | F/P | $n_e$ | $v_e$ | $\vartheta'g$ (×10$^{-4}$) | $\Delta v_e$ |
|---|---|---|---|---|---|---|---|---|---|---|---|---|---|
| 6 | 27.9 | 7.2 | 8.4 | 6.0 | 23.8 | 24.7 |  | 2.0 | 2.88 | 1.5401 | 72.2 | 4786 | +8.7 |
| 7 | 27.9 | 7.2 | 6.4 | 6.0 | 23.8 | 24.7 |  | 4.0 | 2.80 | 1.5432 | 70.6 | 4811 | +9.1 |
| 8 | 27.9 | 7.2 | 4.4 | 6.0 | 23.8 | 24.7 |  | 6.0 | 2.72 | 1.5461 | 69.0 | 4861 | +11.4 |
| 9 | 27.9 | 7.2 | 8.4 | 6.0 | 23.8 | 24.7 | 2.0 |  | 2.91 | 1.5404 | 70.0 | 4858 | +12.2 |
| 10 | 27.9 | 7.2 | 6.4 | 6.0 | 23.8 | 24.7 | 4.0 |  | 2.90 | 1.5445 | 66.3 | 4933 | +14.2 |
| 11 | 27.9 | 7.2 | 4.4 | 6.0 | 23.8 | 24.7 | 6.0 |  | 2.89 | 1.5461 | 62.6 | 4943 | +11.2 |

TABLE 3
[Mol percent]

| Melt No. | Al(PO$_3$)$_3$ | Ca(PO$_3$)$_2$ | LaPO$_4$ | KAsO$_3$ | MgF$_2$ | SrF$_2$ | BaF$_2$ | F/P | $n_e$ | $v_e$ | $\vartheta'g$ (×10$^{-4}$) | $\Delta v_e$ |
|---|---|---|---|---|---|---|---|---|---|---|---|---|
| 1 | 12.5 | 3.3 | 2.0 | 2.0 | 35.7 | 25.5 | 19.0 | 3.48 | 1.5400 | 73.6 | 4837 | +14.2 |
| 2 | 12.5 | 1.6 | 1.9 | 4.0 | 35.6 | 25.4 | 19.0 | 3.76 | 1.5372 | 73.3 | 4812 | +12.2 |
| 3 | 12.4 | 0.0 | 1.9 | 6.0 | 35.5 | 25.3 | 18.9 | 4.08 | 1.5313 | 73.9 | 4829 | +13.6 |
| 4 | 12.5 | 4.9 | 1.0 | 1.4 | 35.7 | 25.5 | 19.0 | 3.32 | 1.5413 | 73.0 | 4811 | +11.5 |
| 5 | 12.5 | 4.9 | 0.0 | 2.8 | 35.5 | 25.3 | 19.0 | 3.38 | 1.5402 | 72.7 | 4799 | +10.2 |

TABLE 4
[Mol percent]

| Melt No. | Al(PO$_3$)$_3$ | Ca(PO$_3$)$_2$ | MgF$_2$ | CaF$_2$ | SrF$_2$ | BaF$_2$ | K$_2$TiF$_6$ | K$_2$TaF$_7$ | F/P | $n_e$ | $v_e$ | $\vartheta'g$ (×10$^{-4}$) | $\Delta v_e$ |
|---|---|---|---|---|---|---|---|---|---|---|---|---|---|
| 6 | 15.3 | 5.3 | 19.6 | 11.2 | 27.4 | 20.5 |  | 0.7 | 2.88 | 1.5401 | 72.2 | 4786 | +8.7 |
| 7 | 16.1 | 5.5 | 15.5 | 11.6 | 28.8 | 21.3 |  | 1.2 | 2.80 | 1.5432 | 70.6 | 4811 | +9.1 |
| 8 | 16.7 | 5.7 | 11.2 | 12.1 | 29.7 | 22.2 |  | 2.4 | 2.72 | 1.5461 | 69.0 | 4861 | +11.4 |
| 9 | 15.3 | 5.2 | 19.6 | 11.1 | 27.2 | 20.4 | 1.2 |  | 2.91 | 1.5404 | 70.0 | 4858 | +12.2 |
| 10 | 15.8 | 5.3 | 15.4 | 11.6 | 28.2 | 21.2 | 2.5 |  | 2.90 | 1.5445 | 66.3 | 4933 | +14.2 |
| 11 | 16.4 | 5.6 | 11.0 | 11.9 | 29.3 | 21.9 | 3.9 |  | 2.84 | 1.5461 | 62.6 | 4943 | +11.2 |

TABLE 5

| Melt No. | Mg (PO₃)₂ | Ca (PO₃)₂ | Al (PO₃)₃ | KF | MgF₂ | CaF₂ | SrF₂ | BaF₂ | K₂TiF₆ | F/P | $n_e$ | $v_e$ | $\vartheta'_g$ (×10⁻⁴) | $\Delta v_e$ |
|---|---|---|---|---|---|---|---|---|---|---|---|---|---|---|
| [Weight percent] | | | | | | | | | | | | | | |
| 12 | 4.0 | 3.2 | 27.9 | 0.4 | 8.9 | 7.0 | 15.8 | 24.7 | 8.1 | 3.08 | 1.5548 | 62.3 | 5045 | +18.1 |
| 13 | 4.0 | 3.2 | 27.9 | 0.4 | 8.9 | 7.0 | 11.8 | 24.7 | 12.1 | 3.16 | 1.5593 | 57.0 | 4964 | +7.2 |
| 14 | 7.2 | | 27.9 | 0.4 | 4.9 | 3.0 | 25.8 | 24.7 | 6.1 | 2.75 | 1.5626 | 62.1 | 4912 | +8.4 |
| 15 | 7.2 | | 27.9 | 0.4 | 2.9 | | 28.8 | 24.7 | 8. | 2.64 | 1.5647 | 58.0 | 5026 | +12.5 |
| 16 | 6.2 | 5.0 | 29.0 | | 8.2 | 6.3 | 18.3 | 22.9 | 4.1 | 2.42 | 1.5641 | 64.5 | 4908 | +10.5 |
| 17 | 2.7 | 1.4 | 25.7 | | 10.4 | 7.9 | 9.1 | 28.0 | 14.8 | 4.08 | 1.5410 | 56.2 | 5083 | +14.5 |
| 18 | 4.2 | 2.8 | 23.2 | | 9.9 | 11.6 | 11.3 | 21.6 | 15.4 | 4.21 | 1.5437 | 55.1 | 5093 | +10.0 |
| [Mol percent] | | | | | | | | | | | | | | |
| 12 | 3.2 | 2.4 | 15.4 | 1.0 | 21.0 | 13.1 | 18.3 | 20.6 | 5.0 | 3.08 | 1.5548 | 62.3 | 5045 | +18.1 |
| 13 | 3.3 | 2.4 | 15.8 | 1.0 | 21.5 | 13.4 | 14.0 | 21.1 | 7.5 | 3.16 | 1.5593 | 57.0 | 4964 | +7.2 |
| 14 | 6.1 | | 16.5 | 1.1 | 12.3 | 6.0 | 32.0 | 22.0 | 4.0 | 2.75 | 1.5626 | 62.1 | 4912 | +8.4 |
| 15 | 6.6 | | 17.5 | 1.1 | 7.8 | | 38.0 | 23.4 | 5.6 | 2.64 | 1.5647 | 58.0 | 5026 | +12.5 |
| 16 | 5.1 | 3.7 | 16.2 | | 19.6 | 12.0 | 21.5 | 19.4 | 2.5 | 2.42 | 1.5641 | 64.5 | 4908 | +10.5 |
| 17 | 2.2 | 1.0 | 14.3 | | 24.6 | 14.9 | 10.6 | 23.4 | 9.0 | 4.08 | 1.5410 | 56.2 | 5083 | +14.5 |
| 18 | 3.2 | 2.0 | 12.4 | | 22.5 | 20.9 | 12.6 | 17.4 | 9.0 | 4.21 | 1.5437 | 55.1 | 5093 | +10.0 |

Based on the use of a mixture of approximately 1 kg. the melting process is as follows:

The finely divided ingredients of the melt mixture are intimately mixed and then molten to a temperature of 1000° C. The mixture is then refined at a temperature of 1100° C. Thereafter the temperature is again reduced to 1000° C., at which temperature the melt is stirred for twenty minutes. While the stirring is continued the temperature is further reduced to approximately 700° C. in approximately ten to fifteen minutes. At the end of this time the melt being in the neighborhood of 700° C. is poured into carbon molds which have been preheated to 400° C. The transformation points of the glasses, according to the invention, are generally just below 500° C., and the softening points are somewhat above that temperature. After the glasses have been cast into the preheated mold they are annealed in the usual manner.

Having described our invention, we claim:

1. A fluorophosphate glass which is characterized by the fact that it is melted from a mixture consisting essentially of:
   between 70 and 85 mol percent of the fluorides of the alkaline-earth metals magnesium, calcium, strontium, barium;
   between 10 and 25 mol percent of the metaphosphates of the alkaline-earth metals magnesium, calcium, strontium, barium, and of aluminum; and
   between 0.5 and 10 mol percent of an alkali-metal fluxing compound selected from the group of $KAsO_3$, $K_2TaF_7$ and $K_2TiF_6$,
   the ratio of fluorine atoms to phosphorous atoms in said glass being between 2.5 and 4.5.

2. A glass according to claim 1 containing up to about 2 mol percent of $LaPO_4$.

3. A method of making a fluorophosphate glass comprising the steps of
   mixing from about 70 to about 85 mol percent of fluorides of the alkaline-earth metals magnesium calcium, strontium, barium; with
   from about 10 to about 25 mol percent of the metaphosphates of the alkaline-earth metals magnesium, calcium, strontium, barium and of aluminum; and
   from about 0.5 to about 10 mol percent of alkali-metal fluxing compounds from the group of $KAsO_3$, $K_2TaF_7$ and $K_2TiF_6$;
   heating the mix at a temperature of about 1000° C. until molten;
   increasing the temperature of the mix to about 1100° C. until the melt has become refined;
   reducing the temperature of the refined melt to about 1000° C. for approximately 20 minutes with agitation thereof;
   further reducing the temperature of the melt to about 700° C. for from about 10 to about 15 minutes with agitation; and
   thereafter pouring the melt into a mold.

References Cited

UNITED STATES PATENTS

| 2,578,325 | 12/1951 | Sun et al. | 106—47 |
| 3,068,108 | 12/1962 | Geffcken | 106—47 |
| 3,281,254 | 10/1966 | Weidel | 106—47 |

FOREIGN PATENTS

| 781,243 | 8/1957 | Great Britain. |

HELEN M. McCARTHY, Primary Examiner

W. R. SATTERFIELD, Assistant Examiner

U.S. Cl. X.R.

65—134, 137